Oct. 6, 1925.  
C. H. BRADY  
SHOCK ABSORBER FOR VEHICLE LAMPS  
Filed Oct. 31, 1924
1,555,902
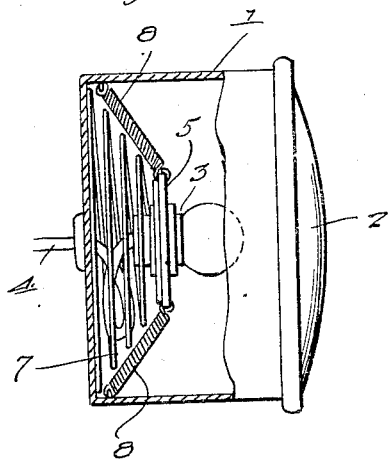
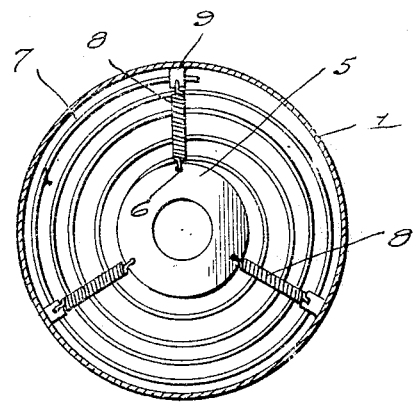
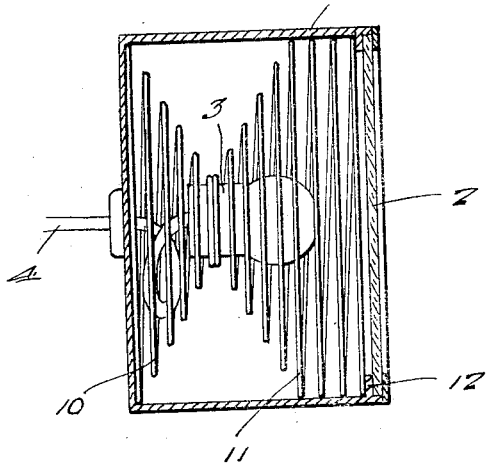
Inventor  
C. H. Brady  
By Clarence A. O'Brien  
Attorney Patented Oct. 6, 1925.

1,555,902

UNITED STATES PATENT OFFICE.

CLAUDE H. BRADY, OF NEODESHA, KANSAS.

SHOCK ABSORBER FOR VEHICLE LAMPS.

Application filed October 31, 1924. Serial No. 747,058.

*To all whom it may concern:*

Be it known that I, CLAUDE H. BRADY, a citizen of the United States, residing at Neodesha, in the county of Wilson and State of Kansas, have invented certain new and useful Improvements in a Shock Absorber for Vehicle Lamps, of which the following is a specification.

This invention relates to a means for supporting the lamps of a tail light for motor vehicles.

One of the important objects of the present invention is to provide a means for supporting a tail light whereby the usual shocks and vibrations imparted thereto incident to the operation of the motor vehicle will be taken up, thereby preventing the breakage of the electric lamp in the tail light.

A further object of the invention is to provide a shock absorber for tail lights of the above mentioned character, which will at all times be efficient and positive in its operation, the device being simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a side elevation of one form of shock absorber showing the same in position within a tail light.

Figure 2 is a front end elevation thereof, and

Figure 3 is a side elevation of another form of shock absorber showing the same in use.

In the drawing, wherein for the purpose of illustration is shown the preferred embodiment of my invention, the numeral 1 designates the casing of any well known type of tail light, the same being open at its front face for receiving the usual colored lens 2. The electric lamp which is disposed within the casing 1 is indicated at 3 and the lamp cord associated therewith is shown at 4, the same being adapted to extend through a suitable opening provided therefor in the back of the casing in the usual manner.

A flat ring or disc 5 is mounted on the base portion of the electric lamp 3 and the same is provided with the spaced openings 6 adjacent the outer periphery thereof. The purpose of the openings will hereinafter be more fully described.

A volute spring 7 is arranged within the casing 1, the smaller end thereof being secured to the rear face of the disc or ring 5 in any suitable manner, the larger end of the volute spring engaging the rear inner face of the casing as clearly illustrated in Figure 1. The volute spring 7 will support the disc or ring 5 and the lamp 3 mounted therein spaced from the walls of the casing. Stabilizing coil springs 8 have their forward ends fastened to the disc or ring 5 by passing the forward free ends of the springs 8 through the openings 6 provided in the disc or ring 5, the opposite ends of the springs 8 being secured to the outermost convolutions of the volute spring 7 by suitable fastening clips shown at 9 in the manner more clearly illustrated in Figure 2. The volute spring and the stabilizing springs 8 will support the ring 5 in which the lamp 3 is mounted in proper position within the casing so that the bulb will not come in contact with the inner walls of the casing when the motor vehicle vibrates, thus preventing the breakage of the electric lamp.

In Figure 3 of the drawing a modification is shown wherein a pair of opposed volute springs 10 and 11 respectively are associated with the electric lamp 3. The smaller ends of the volute springs 10 and 11 encircle the base of the electric lamp 3 and support the same centrally within the casing. The outer ends of the volute spring 10 rest against the rear wall of the casing, while the outer end of the volute spring 11 engages the lens retaining flange 12. It is of course understood that the volute spring 11 is disposed around the lamp 3 in such a manner as not to interfere with the projection of the rays of light from the lamp 3 through the lens 2

It will thus be seen from the foregoing description, that a support for the lamp in a tail light for motor vehicles has been provided which will take up the usual shocks and vibrations imparted thereto incident to the operation of the motor vehicle thereby preventing the bulb of the electric lamp from coming in contact with the inner walls of the casing of the tail light and avoiding the breakage of the lamp. The simplicity in which my device is constructed enables the same to be readily and easily applied in position and will at all times be efficient in carrying out the purposes for which it is designated.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. A shock absorber for tail lights comprising in combination with a casing, and an electric lamp disposed therein, of a disc carried by the base of the electric lamp, a volute spring secured at its smaller end to said disc, the larger end of the spring engaging the rear wall of the casing, and a plurality of coil springs secured at their forward ends to the disc at spaced intervals, the outer ends of said coil springs being fastened to the outermost convolutions of said volute springs.

2. A shock absorber for tail lights comprising in combination with a casing, and an electric lamp disposed therein, of a pair of oppositely arranged volute springs in said casing, the smaller ends of said springs extending around the base of the electric lamp, the larger ends of said springs engaging the front and rear walls of the casing respectively.

In testimony whereof I affix my signature.

CLAUDE H. BRADY.